United States Patent [19]

Muhlethaler

[11] Patent Number: 4,982,536
[45] Date of Patent: Jan. 8, 1991

[54] CONDUIT DEVICE IN A WINDOW PARAPET

[75] Inventor: Erhard Muhlethaler, Schalunen, Switzerland

[73] Assignee: Lanz Oensingen AG, Oensingen, Switzerland

[21] Appl. No.: 446,257

[22] Filed: Dec. 5, 1989

[30] Foreign Application Priority Data

Dec. 22, 1988 [CH] Switzerland .................. 4743/88

[51] Int. Cl.$^5$ .................. E04B 5/48; H02G 3/04; H02G 3/10
[52] U.S. Cl. ........................... 52/220; 174/48
[58] Field of Search ............. 52/220, 221, 242, 287; 439/110–115, 207–211; 220/3.8; 174/48–49

[56] References Cited

U.S. PATENT DOCUMENTS

| | | | |
|---|---|---|---|
| 1,718,254 | 6/1929 | Putnam | 52/220 |
| 1,843,054 | 1/1932 | Weinstein | 220/3.8 X |
| 2,000,243 | 5/1935 | Manske | 52/242 X |
| 2,246,347 | 6/1941 | Catherwood, Jr. | 220/3.8 X |
| 2,330,975 | 10/1943 | Jackson | 220/3.8 |
| 2,558,428 | 6/1951 | Fuller | 52/242 X |
| 3,245,185 | 4/1966 | Rowe | 52/220 X |
| 3,594,966 | 7/1971 | Janic | 174/48 X |
| 3,598,900 | 8/1971 | Drake | 174/48 X |
| 3,742,666 | 7/1973 | Antoniou | 52/221 |
| 4,197,959 | 4/1980 | Kramer | 220/3.8 X |
| 4,555,880 | 12/1985 | Gzym et al. | 52/242 X |
| 4,559,410 | 12/1985 | Hostetter | 174/98 |
| 4,845,316 | 7/1989 | Kaercher | 174/135 |
| 4,872,849 | 10/1989 | Long | 439/211 X |

FOREIGN PATENT DOCUMENTS

1317930 1/1963 France .................. 52/287

Primary Examiner—David A. Scherbel
Assistant Examiner—Deborah McGann Ripley
Attorney, Agent, or Firm—Browdy and Neimark

[57] ABSTRACT

The device has square frames mounted at a distance from each other and with parallel planes on the wall. In the interior of the frames extend ducts, preferably of a lattice structure, which are exchangeably disposed. Furthermore, the frames are used as supports for exterior facing plates. One of the sides of the frames is connected via a hinge with an adjacent side and (together with the facing plate fastened thereon) is outwardly pivotable. Apparatus supports for electric sockets, etc., are mounted in optional locations, also inside the frame cross section, on ducts or on special intermediate supports. Great flexibility with respect to the total cross section, arrangement, fitting with apparatus and choice of facing is made possible.

16 Claims, 3 Drawing Sheets

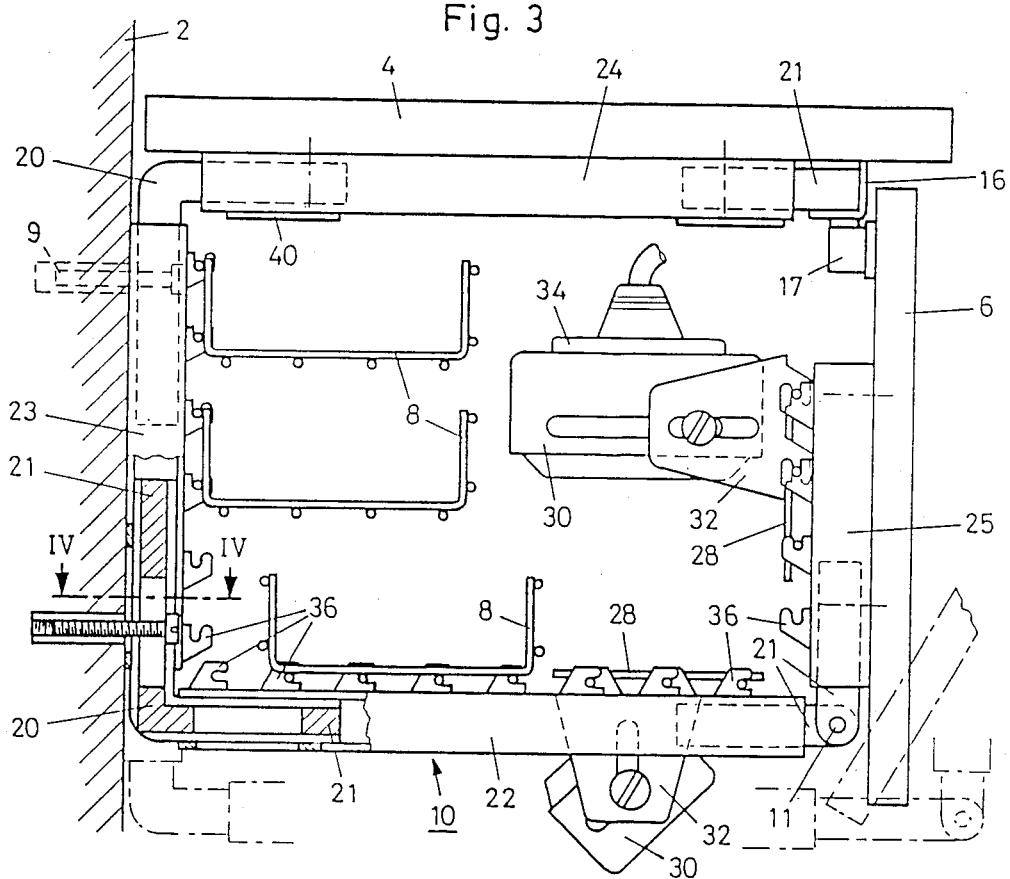
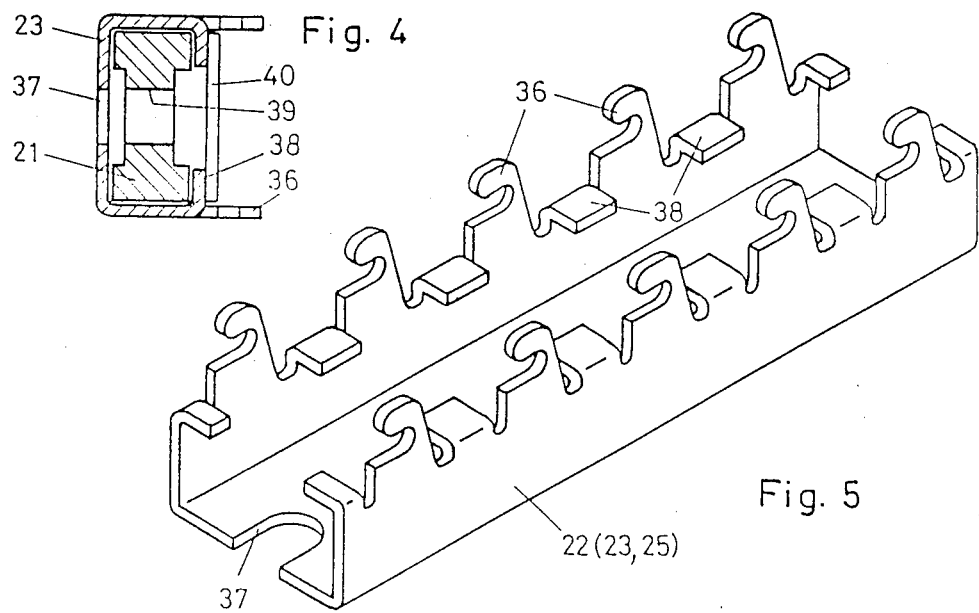

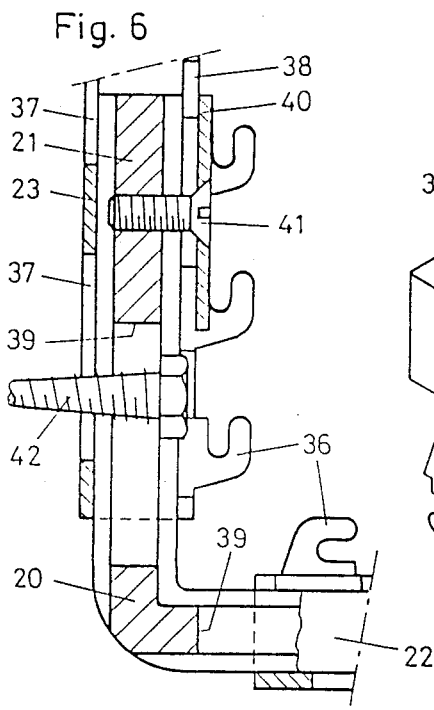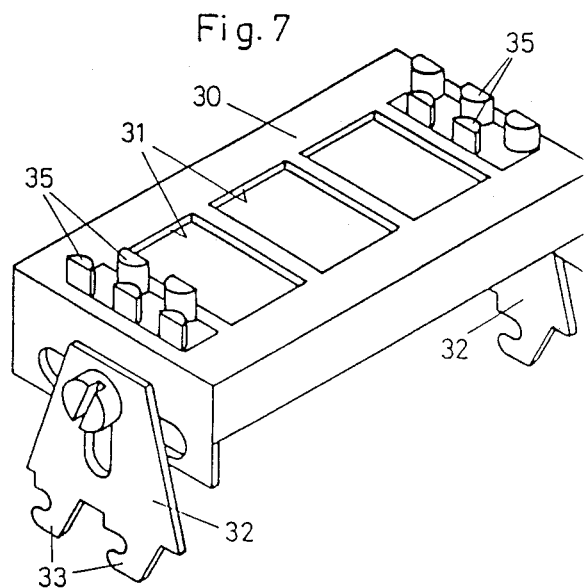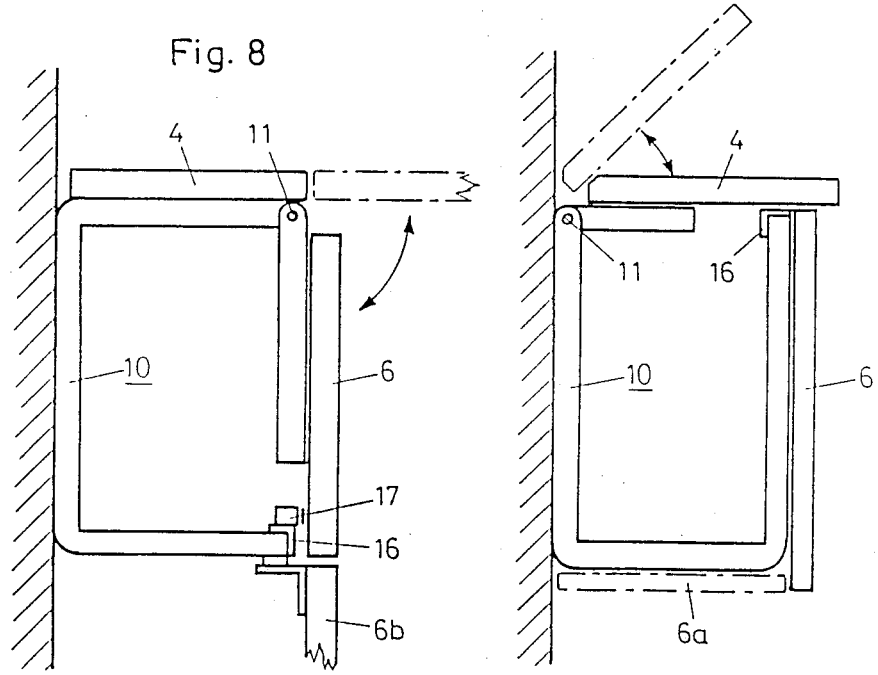

CONDUIT DEVICE IN A WINDOW PARAPET

FIELD OF THE INVENTION

The invention relates to a parapet conduit device in a window comprising a plurality of ducts extending in the longitudinal direction of the conduit.

BACKGROUND OF THE INVENTION

Devices of this type are attached to window parapets, underneath wall overhangs or the like, and are usually found in office or administration buildings. They are used for the protected and orderly guidance for lines of all types, such as electrical lines, telephone lines, data and signal lines, etc., as required. They are also used for placement of electrical sockets, and other apparatus, such as junction boxes, switches, signal keys, etc. in the vicinity of work stations. Window parapet conduits are known in many designs and are mostly in the form of closed box sections, one side of which is designed as a lid or sliding element. They often have an elaborate interior and they are usually extruded of aluminum or plastic.

Up to now, a great diversity of designs, particularly in regard to cross sectional dimensions, material and color, has been considered necessary in order to allow a modicum of esthetic and functional adaptability to the surroundings and requirements of use. In spite of great elaboration, however, it is often necessary to make unsatisfactory compromises. Furthermore, in the known designs, electrical sockets and other apparatus are generally placed at the front. As a result the cross section of the duct in that particular area is "lost" for placing lines. In the case of special coverings of the front, which are adapted to the design of the room, mounting of the apparatus requires considerable additional effort, yet the result may still be unsatisfactory.

SUMMARY OF THE INVENTION

It is an object of the invention to provide a parapet conduit device for a window which, while having a simple and uniform construction, is easily adaptable to various structural realities and permits a free choice of the window sill above it and of a covering over its front (exterior facing panels). Furthermore it is intended that the division and use of the inside cross section be variable in accordance with the requirements of installation and allow for the simple placement of lines and mounting of apparatus as well as possible later additional installations.

This object is attained in accordance with the present invention and is characterized by a plurality of square frames, disposed at a distance from each other. The frames are fastened to the wall with their planes parallel to each other. The frames interchangeably receive the ducts passing through the interior of the frames, as well as supports for exterior facing panels on at least two sides, one of the four sides of a frame being connected with an adjoining side of a frame by means of a hinge and being pivotable towards the outside. Such a design allows cost efficient, standardized manufacture and extensive pre-assembly, while maintaining adaptability in that the window sill and parapet or the entire facing can be independently designed on the job site and mounted afterwards. The interior of the conduit device is easily accessible by outwardly pivoting one side of the frame. Electrical sockets and apparatus can be disposed at the front, as was the case up to now, but can also be housed in the interior or on the outside of the normally open underside of the conduit device. This satisfies most requirements regarding appearance and use or accessibility.

The invention is described in detail below by means of exemplary embodiments with the aid of the drawings.

BRIEF DESCRIPTION OF THE DRAWINGS

FIG. 3 is a side view of an individual frame of the preferred design, provided with ducts and apparatus supports extending through it, FIG. 4 is a section along the line IV—IV in FIG. 3, FIG. 5 is a perspective view of a frame element with rows of hooks for the frame in accordance with FIG. 3, FIG. 6 shows the lower left corner of the frame in accordance with FIG. 3 in section, FIG. 7 is a perspective view of an apparatus support with hook elements and FIGS. 8 and 9 schematically illustrate two variants in regard to length of the pivotable side of the frame as well as other possibilities of mounting.

DETAILED DESCRIPTION OF THE PREFERRED EMBODIMENT

Figure 1:
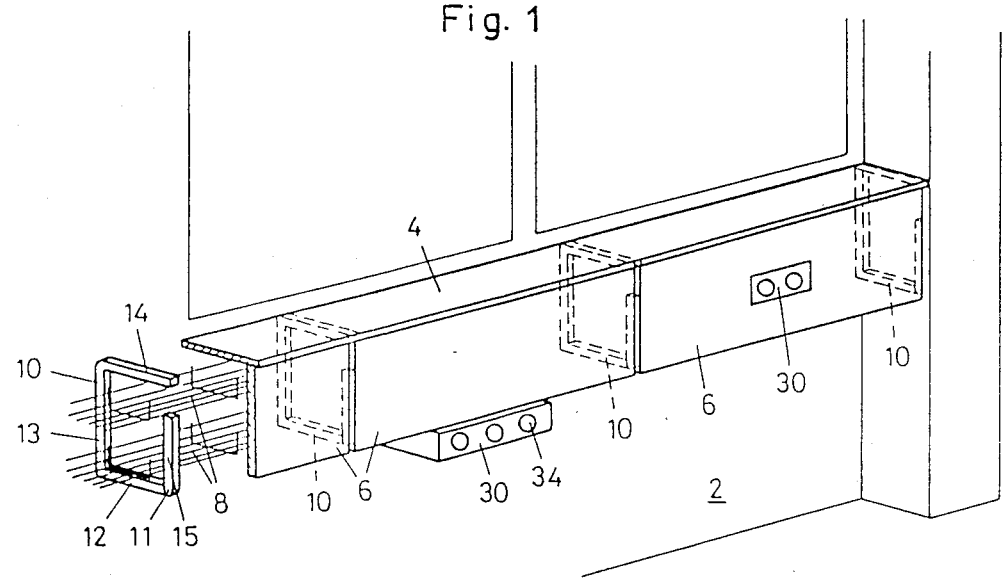
FIG. 1 is a simplified, perspective view of the general construction of an exemplary conduit device for a window parapet.

The conduit in a window parapet, schematically shown in FIG. 1, comprises a plurality of quadrilateral, preferably rectangular or square frames 10 fastened on a wall, in this case a window parapet 2, at a distance from each other and with their planes parallel to each other. The distances between the frames 10 are selected in accordance with the structural requirements and should be approximately 80 to 100 cm. Ducts 8 extend through the interiors of the frames 10 and are fastened interchangeably in variable dispositions on the frame 10, as described below. As Ducts 8 are preferably those of a grid design, known per se. Longitudinal ribs, connected by lateral ribs, are used. Furthermore, the frames 10 are used as supports for facing panels. In the present case a continuous window sill 4, connected with the top sides 14 of the frame and a front facing, divided into sections 6, is fastened to the vertical sides 15 of the frame, which are located opposite the sides 13 of the frame mounted on the wall. One particular side of the frame—in the preferred embodiment the side 15 supporting the front sections 6—is connected to an adjacent side 12 of the frame via a hinge 11 and in this manner is outwardly pivotable (together with the front facing). When being outwardly pivoted, the upper edge of the front facing 6 moves away from the front edge of the window sill 4, which makes the interior of the parapet conduit accessible. The pivot angle may be limited by suitable means, not shown in detail here.

Figure 2:
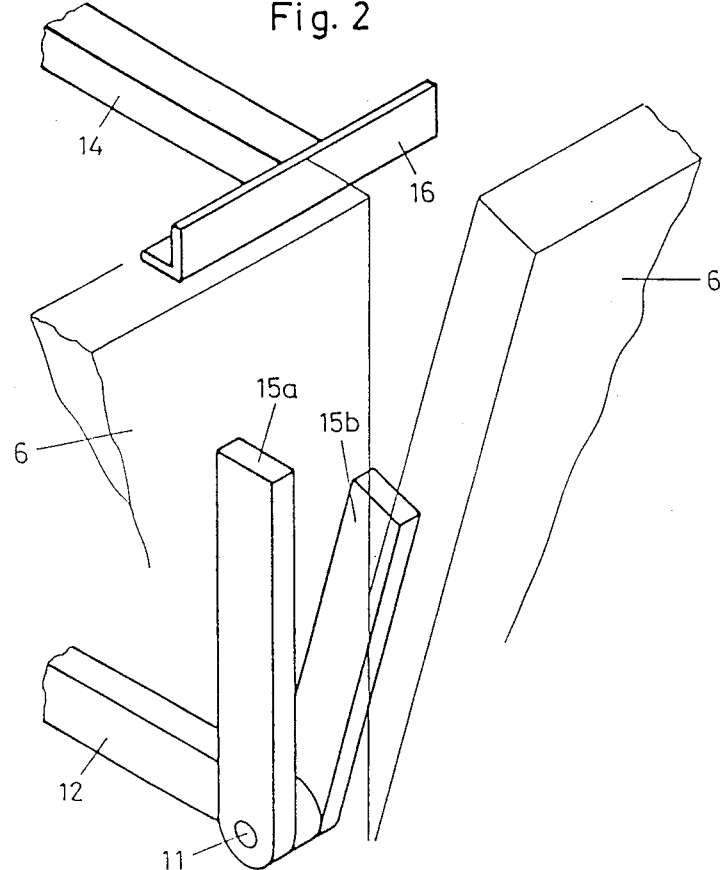
FIG. 2 illustrates an advantageous design of the pivotable side of the frame with two separately connected arms.

If, as front facing 6 and window sill 4 also comprise exterior facing panels in the preferred embodiment, the outwardly pivotable sides 15 of the frame support a facing plate divided into sections 6, it is practical, as shown in FIG. 2, to provide two adjacent, individually actuated arms 15a, 15b for fastening of the sections 6, so that they can be outwardly pivoted independently of each other. Furthermore, in accordance with FIG. 2, a stop element 16 is provided on the free end of the fixed side 14 of the frame, which is oriented toward the outwardly pivotable side 15 of the frame. To the extent that, as illustrated, the side 15 of the frame or its arms are shortened, the sections 6 catch directly on the stop element 16. As a variant, it is possible that the side 15 or its arms extend as far as the stop element 16 (which then is located further back) and cooperate with it.

As required, the parapet conduit device illustrated can also be equipped with apparatus supports 30 which receive the required electrical sockets and other apparatus 34. Practical embodiments and variations of placement are described in connection with the remaining figures.

FIG. 3 shows a particularly practical exemplary embodiment of an individual frame 10, assembled from four straight side segments 22 to 25, a hinge 11 and two rigid, two-armed corner connectors 20. The upper side segment 24 supports the window sill 4 and is provided with the adjustable stop element 16, while the front facing section 6 is fixed on the outwardly pivotable side segment 25. To secure the front facing section 6 in the closed position shown, the stop element 16 has been provided with a suitable snap closure, for example a magnetic catch 17.

Building block construction of the frames 10 with detachable connection, longitudinally adjustable, of the side segments 22 to 25 with respect to the arms of the hinge 11, with the corner connectors 20 and with the stop element 16 is particularly suitable. Further details of this construction are shown in FIGS. 4 to 6. Accordingly, the straight side segments 22 to 25 are formed by segments of a generally rectangular hollow section. The hinge 11, the corner connectors 20 and the stop element 16 are each provided with two arms 21, which can be slid in the longitudinal direction into the hollow section. The hollow section, approximately in the shape of a letter C, has been provided on its "back" with longitudinal slits 37, while the arms 21 have longitudinal slits 39. The slits 37 and 39 are used for the insertion of screws 42 (FIG. 6) for fastening of the frames 10 on the wall or for mounting the facing plates (exterior facing panel) 4 and 6 on the frames. Orientation between the arms 21 and the section segments with adjustable longitudinal overlap is performed by means of clamping plates 40 and screws 41, which are inserted into a threaded bore of the arms (FIG. 6).

The construction shown allows the assembly or preassembly of frames of any desired length, having a "horizontal" or "vertical" rectangular shape, from a few simple standard parts. Even in case of a fixed length of the section segments 22 to 25, it is possible, thanks to the adjustable connection with clamping plates 40 and screws 41, to make an adjustment of the cross section at the site, as indicated in FIG. 3 by dash-dotted lines.

It is, of course, also possible to achieve a building block-like assembly of the frames 10 from section segments which are connected longitudinally adjustable with corner connectors or the like, by means of a section having a U-shaped profile in place of the C-shaped profile illustrated.

It is, of course, also possible to dispose the hinge 11 at another corner of the frame 10, as schematically illustrated in FIGS. 8 and 9. According to the variant of FIG. 8, the front facing sections 6 can be folded up from below, and the design of FIG. 9 allows the folding open of the window sill 4, while the front facing 6 is fixed. Furthermore, FIG. 8 shows the possibility of mounting a downwardly extending parapet facing 6b on the frame 10. While in this case, as a rule, the extended parapet conduit is maintained open towards the bottom, it is possible, in accordance with FIG. 9, to apply a lower cover plate 6a on the frame 10, if desired.

From FIG. 3, various possibilities of the interior fittings of the cable duct 8 design become clear. For suspending extended ducts 8, segments of a section in accordance with FIG. 5 are provided on individual frame segments, in this case the sides 22, 23 and 25. This section has rows of hooks 36 with tabs 38 being located between the hooks for the slideable placement of the clamping plates 40 (FIG. 4).

The rows of hooks 36 are used for suspending the ducts 8, preferably made of a wire frame, in adjustable positions. It is possible, of course, to use ducts of various cross sections, depending on the requirements.

Apparatus supports 30 are also part of the fittings, such as shown, for example, in FIG. 7. Such housing-like apparatus supports are provided with perforations or "windows" 31, in which it is possible to mount apparatus such as electrical sockets, switches, etc. Two laterally adjustable fastening plates 32 are provided with hooks 33 which have the same division as the hooks 36 and which are used for mounting the apparatus supports 30. The hooks 33 can either be suspended on the longitudinal ribs of a duct 8 (not shown) or on a lattice-like intermediate support 28 which, in turn, is suspended on rows of hooks 36. As shown, apparatus supports 30 can be disposed in this way in a multitude of ways, either in the interior of the frame cross section or downwardly extending. It is also possible to set a suitable inclination of the apparatus by the alignment of the hook elements 32, 33. In accordance with FIG. 7, the apparatus supports 30 may be provided with strain relief elements 35 for apparatus cables which, for example, form a kind of wave-shaped groove into which the cable is pressed to keep it in place. It is also possible to dispose strain relief elements 35 of the type shown or of a similar type at other locations of the parapet conduit device in the area of the apparatus 34.

Thus, the parapet conduit device described is extraordinarily adaptable with respect to the size of the total cross section, as well as to the fittings of the frames with ducts and apparatus, an optimum use of the frame cross sections will be achieved according to the particular circumstances. In any case, accessibility of the apparatus as well as of the ducts remains assured. Subsequent changes in the routing of the ducts and fitting with apparatus are possible at any time. Of particular advantage is the fact that the facing plates can be designed completely independently of the actual construction of the parapet conduit and the fact that they can be installed by qualified personnel even after mounting of the installation. Thus, facings of various materials (wood, plastic, metal, etc.) can be used and adapted in their color and surface to the design of the room, while later changes are easily possible.

What is claimed:
1. A parapet channel device comprising:
a plurality of longitudinally extending interior supporting conduits adapted for supporting wires, cables and tubings,
a plurality of rectangular frames disposed at a distance from each other along said supporting conduits in planes parallel to each other, said frames being adapted for being fastened to a wall at one of their sides and for the fastening exterior facing panels on at least two of their remaining sides;

one of the sides of each frame being connected to an adjoining side by means of a hinge to render it pivotable outwardly of the frames, and said frames being further provided with fastening means for interchangeably fastening said longitudinally extending supporting conduits at selected places along the interior sides of the frames.

2. A parapet conduit device in accordance with claim 1, wherein the outwardly pivotable side (15) of the frame has two adjacently placed, individually linked arms (15a, 15b).

3. A parapet conduit device in accordance with claim 1, wherein a free end of a fixed side of said frames which is oriented towards an outwardly pivotable side of the said frames has been adjustable stop element (16).

4. A parapet conduit device in accordance with claim 1, wherein the square frames (10) further comprises two straight side segments (22 to 25), a hinge (11) and two rigid, two-armed corner connectors (20).

5. A parapet conduit device in accordance with claim 4, wherein the side segments (22 to 25) are connected removably and longitudinally adjustable with the arms (21) of the hinge (11) and of the corner connectors (20).

6. A parapet conduit device in accordance with claim 1, wherein at least one of the sides (12 to 15) of the frame is provided with rows of hooks (36) for suspending ducts (8).

7. A parapet conduit device in accordance with claim 6, wherein said ducts (8) are made of a lattice structure with longitudinal ribs and lateral ribs connecting said longitudinal ribs.

8. A parapet conduit device in accordance with claim 1, further comprising apparatus supports (30) fixable at selected locations along said frames.

9. A parapet conduit device in accordance with claim 7, further comprising apparatus supports (30) fixable at selected locations along said frames.

10. A parapet conduit device in accordance with claim 8, wherein the apparatus supports (30) are provided with hook elements (32, 33) for suspension on the frames.

11. A parapet conduit device in accordance with claim 9, wherein the apparatus supports (30) are provided with hook elements (32, 33) for suspension on the longitudinal ducts (8).

12. A parapet conduit device in accordance with claim 6, further comprising suspendable, lattice-like intermediate supports (28) for receiving hook elements (32, 33) on rows of hooks (36).

13. A parapet conduit device in accordance with claim 10, further comprising suspendable, lattice-like intermediate supports (28) for receiving the hook elements (32, 33) on the rows of hooks (36).

14. A parapet conduit device in accordance with claim 10, wherein the hook elements (32, 33) are connected with the apparatus supports (30) in a longitudinally adjustable manner.

15. A parapet conduit device in accordance with claim 1, further comprising strain relief elements (35) for apparatus cables disposed in the area of the apparatus (34).

16. A parapet conduit device in accordance with claim 11, further comprises strain relief elements (35) for apparatus cables disposed in the area of the apparatus (34).

* * * * *